United States Patent Office 3,481,823
Patented Dec. 2, 1969

---

3,481,823
GLASS REINFORCED EPOXY ANHYDRIDE POLYMERS
Ival O. Salyer, Dayton, and David Gerald Glasgow, Centerville, Ohio, assignors to Monsanto Research Corporation, St. Louis, Mo., a corporation of Delaware
No Drawing. Filed Nov. 14, 1966, Ser. No. 593,751
Int. Cl. B32b 27/38, 17/10; C09j 3/16
U.S. Cl. 161—93        12 Claims The invention described herein was made or conceived in the course of, or under, a contract with the U.S. Atomic Energy Commission.

This invention relates to solid, high strength products and more particularly provides new and valuable composite structures and the method of making the same.

We have found that valuable structural materials, including objects of diverse shapes and forms are provided when certain epoxidized anhydrides are polymerized in the presence of an inorganic fibrous reinforcing agent. The in-situ homopolymerization of the anhydrides results in firm bonding of the polymer to the reinforcing agent, thereby resulting in composites comprising the fibrous material and the homopolymer as the matrix therefor.

Fabrication of the presently provided composites involves homopolymerization, by heating at a temperature of 100° to 400° C. and while in contact with a inorganic fibrous reinforcing agent, an alicyclic epoxy anhydride of the formula.

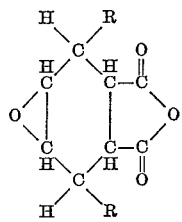

wherein R is hydrogen or alkyl of from 1 to 5 carbon atoms. Examples of alicyclic epoxy anhydrides of the above formula are 4,5-epoxycyclohexane-1,2-dicarboxylic anhydride,
3-methyl-4,5-epoxycyclohexane-1,2-dicarboxylic anhydride,
3,6-dimethyl-4,5-epoxycyclohexane-1,2-dicarboxylic anhydride,
3-ethyl-6-methyl-4,5-epoxycyclohexane-1,2-dicarboxylic anhydride,
3,6-dipropyl-4,5-epoxycyclohexane-1,2-dicarboxylic anhydride,
3-methyl-6-propyl-4,5-epoxycyclohexane-1,2-dicarboxylic anhydride,
3,6-dibutyl-4,5-epoxycyclohexane-1,2-dicarboxylic anhydride,
3-ethyl-6-butyl-4,5-epoxycyclohexane-1,2-dicarboxylic anhydride,
3,6-dipentyl-4,5-epoxycyclohexane-1,2-dicarboxylic anhydride,
3-pentyl-6-methyl-4,5-epoxycyclohexane-1,2-dicarboxylic anhydride, etc.

The reinforcing agents which are employed in preparing the presently provided composites may be any suitable inorganic, fibrous materials, e.g., asbestos fibers, glass fibers, boron fibers, carbon fibers, silicon fibers, etc. The fibers may be woven in filament or rovings form, sized or unsized.

For the preparation of laminates, the epoxy anhydride is positioned between sheets of an inorganic fibrous reinforcing material to obtain a stacked structure comprising a plurality of each of said sheets separated by a layer of the epoxy anhydride and the structure is then submitted to compression molding at a pressure of 50 to 5000 p.s.i. and a temperature of 100° to 400° C. Preferably the epoxy anhydride, in finely comminuted solid form, is sprinkled on each ply before the next ply is stacked on it. Thereby there are obtained alternating layers of textile and epoxy anhydride.

Shaped hollow forms comprising the present composites may also be fabricated by filament winding techniques. For example, glass fiber is passed through a solution of the epoxy anhydride in a suitable solvent and the thus-treated fiber is subsequently wound onto a mandrel under tension and heated to effect polymerization of the epoxy anhydride. This results in adhesion of the coated filaments to each other. As examples of suitable solvents may be mentioned the chlorobenzenes including 1,2,4-trichlorobenzene, o-dichlorobenzene and chlorobenzene, or polar solvents such as dimethyl sulfoxide, dimethylformamide, tetrahydrofuran, etc.

Composites comprising the inorganic, fibrous reinforcing agents may also be prepared by mixing filaments or rovings with the finely comminuted epoxy anhydride, e.g., on a rolling mill, and compression molding the mixture at a pressure of from 50 to 5000 p.s.i. and a temperature of 100° to 400° C. In order to prepare cast objects, a solution of the epoxyanhydride in a volatilizable solvent is slurried with the inorganic fibrous filaments or rovings and poured into a mold. Heating the mold from 100° C. to 400° C. results in simultaneous removal of the solvent and polymerization of the epoxy anhydride. There is thus obtained a strong, integral unit.

The presently provided compositions are useful for a wide variety of applications, but of particular importance are the uses in fields requiring substantial flexural strength and low deflection upon bending. The compression molded composites, which may be of any shape or form are strong, very rigid, moisture resistant and exceptionally resistant to shock. In addition, the composites obtained by the practice of the invention have good surface smoothness and dimensional stability. The invention thus provides a means of fabricating valuable housings of any kind, furniture such as chairs, structural panels, tiles, etc.

The invention is further illustrated by, but not limited to, the following examples.

EXAMPLE 1

Four-ply laminates were made from glass cloth (4½″ x 4½″) and 4,5-epoxycyclohexane-1,2-dicarboxylic anhydride in the following manner.

Finely comminuted 4,5 - epoxycyclohexane - 1,2 - dicarboxylic anhydride was sprinkled on 4 plies of heat-cleaned glass cloth and on the supporting plate in the following proportions:

| | G. |
|---|---|
| Resin sprinkled on polished plate over a 4½″ x 4½″ area | 3.45 |
| Resin sprinkled on ply 1 | 2.4 |
| Resin sprinkled on ply 2 | 2.4 |
| Resin sprinkled on ply 3 | 2.4 |
| Resin sprinkled on ply 4 | 3.45 |

The plies were stacked on top of each other as the resin was deposited, and a second polished plate was placed over the top ply. The total weight of the glass cloth was 15.5 g.; that of the epoxy anhydride was 14.1 g.

Before using the polished plates, the plates were thoroughly cleaned and treated with a silicone release agent.

The assembly was placed into a press, and the bottom platen was raised so that the top polished plate would contact the upper press platen for good heat conductivity. The temperature was raised to about 160° C. and held at that point until the resin began to flow. The press was pumped up and down to determine, by visual observation, when the resin was no longer flowing. After the resin no longer showed signs of flowing, 500 p.s.i. of pressure was applied and the temperature raised to 250° C. and held at that point. The pressure and temperature were maintained at these values for 1.5 hours. The laminate was then allowed to cool slowly while the pressure was maintained at 500 p.s.i. After cooling, the laminate was removed from the press and post-cured for 3 hours at 176.7° C (350° F.) and 3 hours at 204.4° C. (400° F.). There was thus obtained a smooth integral unit having a flexural strength of 78,400 p.s.i. at room temperature.

EXAMPLE 2

Another laminate was prepared in the same manner and under the same condition as in Example 1. However, the glass fiber cloth which was used here was sized with methacrylic chromic chloride (Volan A).

After post-curing as in Example 1, there was obtained a well-bonded, smooth laminate having a flexural strength of 65,317 p.s.i. at room temperature.

What is claimed is:

1. A composite structure comprising an inorganic fibrous reinforcing agent and, as a matrix therefor, a homopolymer of an alicyclic epoxy anhydride of the formula

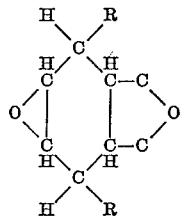

wherein R is hydrogen or alkyl of from 1 to 5 carbon atoms.

2. The composite structure defined in claim 1, further limited in that the epoxy-substituted dicarboxylic anhydride is 4,5-epoxycyclohexane-1,2-dicarboxylic anhydride.

3. The composite structure defined in claim 1, further limited in that said epoxy anhydride is in finely comminuted form.

4. The composite structure defined in claim 1, further limited in that the inorganic fibrous reinforcing agent is glass cloth.

5. The process of fabricating a composite which comprises homopolymerization by heating at a temperature of 100° C. to 400° C. an alicyclic epoxy anhydride of the formula

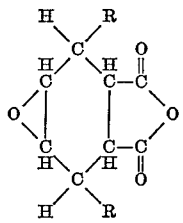

wherein R is hydrogen or alkyl of from 1 to 5 carbon atoms, while in contact with an inorganic fibrous reinforcing agent.

6. The process defined in claim 5, further limited in that the alicyclic epoxyanhydride is 4,5-epoxycyclohexane-1,2-dicarboxylic anhydride.

7. The process defined in claim 5, further limited in that said anhydride is in solid, finely comminuted form.

8. The process defined in claim 5, further limited in that the fibrous inorganic reinforcing agent is glass cloth.

9. The process of fabricating a laminate which comprises positioning between sheets of an inorganic fibrous reinforcing material an alicyclic epoxy anhydride of the formula

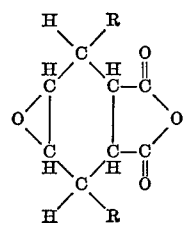

wherein R is hydrogen or alkyl of from 1 to 5 carbon atoms, to obtain a stacked structure comprising a plurality of each of said sheets separated by a layer of said anhydride and then submitting the structure to compression molding at a pressure of 50 to 5000 p.s.i. and a temperature of 100° C to 400° C.

10. The process defined in claim 9, further limited in that the epoxy anhydride is 4,5-epoxycyclohexane-1,2-dicarboxylic anhydride.

11. The process defined in claim 9, further limited in that the alicyclic epoxy anhydride is in finely comminuted form.

12. The process defined in claim 9, further limited in that the inorganic, fibrous reinforcing agent is glass cloth.

References Cited

UNITED STATES PATENTS

| 2,794,028 | 5/1957 | Phillips et al. | |
|---|---|---|---|
| 2,985,616 | 5/1961 | McGary | 161—184 X |
| 3,159,595 | 12/1964 | Parry | 161—184 X |
| 3,268,476 | 8/1966 | Mueller | 161—185 X |
| 3,278,456 | 10/1966 | Starcher et al. | |
| 3,308,094 | 3/1967 | Sherr | 161—185 X |
| 3,362,932 | 1/1968 | Mauz. | |

ROBERT F. BURNETT, Primary Examiner

M. A. LITMAN, Assistant Examiner

U.S. Cl. X.R.

156—330; 161—185, 203; 260—2, 348